United States Patent
Cavaliere

(10) Patent No.: US 9,806,804 B2
(45) Date of Patent: Oct. 31, 2017

(54) METHOD AND APPARATUS FOR CONFIGURING AN OPTICAL PATH

(75) Inventor: Fabio Cavaliere, Vecchiano Pisa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 201 days.

(21) Appl. No.: 14/407,066

(22) PCT Filed: Jul. 2, 2012

(86) PCT No.: PCT/EP2012/062802
§ 371 (c)(1),
(2), (4) Date: Dec. 10, 2014

(87) PCT Pub. No.: WO2014/005613
PCT Pub. Date: Jan. 9, 2014

(65) Prior Publication Data
US 2015/0162980 A1   Jun. 11, 2015

(51) Int. Cl.
*H04B 10/07* (2013.01)
*H04B 10/079* (2013.01)
(Continued)

(52) U.S. Cl.
CPC ..... *H04B 10/07953* (2013.01); *H04B 10/516* (2013.01); *H04J 14/02* (2013.01); *H04L 1/0009* (2013.01)

(58) Field of Classification Search
CPC . H04B 10/07953; H04B 10/516; H04J 14/02; H04L 1/0009
(Continued)

(56) References Cited

U.S. PATENT DOCUMENTS

| 6,433,904 B1 * | 8/2002 | Swanson | H04B 10/07953 398/91 |
| 6,915,076 B1 * | 7/2005 | Mittal | H04B 10/07955 398/26 |

(Continued)

FOREIGN PATENT DOCUMENTS

WO   2009/020529 A2   2/2009

OTHER PUBLICATIONS

PCT International Search Report, mailed Mar. 20, 2013, in connection with International Application No. PCT/EP2012/062802, all pages.

(Continued)

*Primary Examiner* — Ken N Vanderpuye
*Assistant Examiner* — Dibson Sanchez
(74) *Attorney, Agent, or Firm* — Laffler Intellectual Property Law, PLLC

(57) ABSTRACT

An optical path for transmission of data from a source node to a destination node comprises an optical channel for parallel transmission of non overlapping carrier frequencies. The frequency separation of the carriers is lower than the baud rate. The optical path is configured by (a) determining a path OSNR ($OSNR_p$); (b) selecting a carrier bandwidth (BW) so that the channel bandwidth ($BW_T$) is less than or equal to a maximum path bandwidth available for transmission, wherein $BW_T \approx BW \cdot C$, wherein C is the number of carrier frequencies; (c) selecting a FEC code having a minimum overhead requirement; (d) determining a channel OSNR ($OSNR_T$) based on the currently selected BW and FEC code; (e) in response to determining that $OSNR_T$ is not less than or equal to $OSNR_p$, reselecting new codes having increasing overhead requirements until $OSNR_T$ is less than $OSNR_p$, and if this is not possible increasing $BW_T$ and (Continued)

returning to step (c); (h) configuring the path for transmission based on the finally selected $BW_T$ and FEC code.

14 Claims, 7 Drawing Sheets

(51) Int. Cl.
  *H04B 10/516* (2013.01)
  *H04L 1/00* (2006.01)
  *H04J 14/02* (2006.01)
(58) Field of Classification Search
  USPC .................................................. 398/25–38
  See application file for complete search history.

(56) References Cited

U.S. PATENT DOCUMENTS

| | | | | |
|---|---|---|---|---|
| 7,218,852 B1* | 5/2007 | Sharma | ............... | H04J 14/0227 398/25 |
| 8,433,969 B1* | 4/2013 | Wu | ..................... | H03M 13/353 714/748 |
| 9,215,029 B2* | 12/2015 | Han | ..................... | H04J 14/0221 |
| 2002/0104053 A1* | 8/2002 | Lei | ........................ | H04L 1/0041 714/752 |
| 2003/0016411 A1* | 1/2003 | Zhou | .................. | H04Q 11/0062 398/5 |
| 2004/0052532 A1* | 3/2004 | Morita | ................. | H04B 10/505 398/140 |
| 2007/0049207 A1* | 3/2007 | Haghighat | ........... | H04L 1/0003 455/69 |
| 2008/0256421 A1* | 10/2008 | Gerstel | .............. | H03M 13/353 714/776 |
| 2008/0260378 A1* | 10/2008 | Khermosh | ........... | H04L 1/0009 398/17 |
| 2010/0003032 A1* | 1/2010 | Houle | ................. | H04J 14/0227 398/79 |
| 2010/0080562 A1 | 4/2010 | Perkins et al. | | |
| 2011/0188852 A1* | 8/2011 | Stodola | .................. | H04J 14/02 398/27 |
| 2011/0236013 A1* | 9/2011 | Gazzola | ............. | H04J 14/0258 398/5 |
| 2012/0002961 A1* | 1/2012 | de Lind van Wijngaarden | ......... | H04J 3/1694 398/26 |
| 2012/0082459 A1* | 4/2012 | Wu | ......................... | H04J 14/02 398/79 |
| 2012/0251119 A1* | 10/2012 | McNicol | ................. | H04J 14/02 398/91 |
| 2013/0142508 A1* | 6/2013 | Bottari | ................... | H04B 10/27 398/26 |
| 2013/0191696 A1* | 7/2013 | Roberts | ............. | H03M 13/2906 714/755 |
| 2013/0209093 A1* | 8/2013 | Tanimura | ........... | H04B 10/0775 398/32 |
| 2013/0216221 A1* | 8/2013 | Zhang | ................... | H04L 1/0057 398/43 |
| 2014/0019830 A1* | 1/2014 | Chen | ....................... | H04L 1/004 370/389 |
| 2014/0328587 A1* | 11/2014 | Magri | ..................... | H04L 45/62 398/26 |

OTHER PUBLICATIONS

Bosco, G. et al. "Investigation on the robustness of a Nyquist-WDM Terabit superchannel to transmitter and receiver non-idealities" 36th European Conference and Exhibition on Optical Communication, Sep. 19-23, 2010, Torino, Italy, IEEE, pp. 1-3, XP031789593, ISBN: 978-1-4244-8536-9.

Barbieri, A. et al. "Is Optical OFDM a Viable Alternative to Single-Carrier Transmission for Future Long-Haul Optical Systems?" IEEE ICC 2010 Proceedings, May 23-27, 2010, pp. 1-5, ISBN: 978-1-4244-6402-9.

Yamazaki, H. et al. "Flexible-format Optical Modulators with a Hybrid Configuration of Silica Planar Lightwave Circuits and LiNbO3 Phase Modulators" NTT Technical Review, vol. 9, No. 4, Apr. 2011, pp. 1-8.

Colavolpe, G. et al. "Task 5.1 400G System modeling and DSP Technical Report" Scuola Superiore Sant'Anna—Ericsson SPEED Project WP5: DSP for Optical Transmission, Dec. 2011, pp. 1-45.

Colavolpe, G. "Faster-than-Nyquist and beyond: how to improve spectral efficiency by accepting interference"ECOC 2011, Geneva, Sep. 18-22, 2011, pp. 1-25, ISBN: 978-1-4577-1918-9.

ITU-T, Telecommunication Standardization Sector of ITU, Series G, Supplement 39 (Dec. 2008), Series G: Transmission Systems and Media, Digital Systems and Networks, Optimal system design and engineering considerations, 106 pages.

\* cited by examiner

METHOD AND APPARATUS FOR CONFIGURING AN OPTICAL PATH

FIELD OF THE INVENTION

The present invention relates to method and apparatus for configuring an optical path. In particular, but not exclusively, it relates to method and apparatus for configuring an optical path for transmission of data from a source node to a destination node, the optical path comprising an optical channel for parallel transmission of non overlapping frequency carriers.

BACKGROUND TO THE INVENTION

As traffic demands in communication systems continue to increase, supporting data rates beyond 100 Gbit/s will be required to increase the network capacity. A mere increase of the line rate is not viable due to bandwidth limitations in optical and electronic components and poor tolerance to signal-to-noise ratio. Multi-level modulation formats solve the former issue but exacerbate the second one. This makes modulation formats which are more complicated than, say 16 Quadrature Amplitude Modulation (16QAM) impractical. Multi-carrier transmission is therefore introduced as a straightforward option to multiply the channel capacity. Orthogonal Division Multiplexing (OFDM) is one example, where digitally generated orthogonal carriers are densely packed in order to save spectrum or, equivalently, maximize Spectral Efficiency (SE) measured in transmitted bit/s/Hz. Though OFDM is very attractive due to its high SE and the possibility of configuring bandwidth and modulation format in the digital domain, it presents drawbacks when utilised in high speed optical interfaces as disclosed, for example, in A. Barbieri et al: "Is Optical OFDM a Viable Alternative to Single-Carrier Transmission for Future Long-Haul Optical Systems?", IEEE ICC 2010 proceedings.

On the other hand, the so called super-channels, i.e. the parallel transmission of non frequency overlapping optical carriers, though easier to implement than OFDM, generally lack spectral efficiency. This is because to avoid spectral overlap, or inter-carrier interference (ICI) the distance between adjacent carriers, $\Delta F$, must be not lower than twice the baseband signal width, $BW_0$, that, in practical systems, equals to a $\alpha \cdot B$, where B is the carrier baud rate and $\alpha$ is a roll-off factor, typically $0.6 < \alpha < 0.7$.

$$\Delta F \geq 2 \cdot BW_0 = 2 \cdot \alpha \cdot B \qquad \text{Eq.1}$$

SE can be improved by decreasing the baud rate B and, thus, $BW_0$. However, this causes increased complexity of the modulation scheme, i.e.

$$BW_0 = \alpha \cdot B = \alpha \cdot R_b \cdot \log_2(M) \qquad \text{Eq. 2}$$

Where $R_b$ is the bit rate and M is the number of constellation symbols (e.g. M=4 for Quadrature Shift Keying (QPSK), M=8 for 8PSK and M=16 for 16QAM).

However, as mentioned above, bigger constellation sizes imply low tolerance to optical noise and, ultimately, lower achievable link distances between nodes.

An alternative approach to improve SE is increased filtering in the electrical or the optical domain. The modulated carriers before they are multiplexed and sent into the optical channel are filtered so that $\Delta F < 2 \cdot BW_0$. However, time overlap of transmitted pulses, namely inter-symbol interference (ISI) is introduced. This needs to be recovered at the receiver which increases the complexity of the receiver.

This approach is known as "faster than Nyquist" transmissions, i.e. $\Delta F < BW_0$ as disclosed, for example, in G. Colavolpe: "Faster-than-Nyquist and beyond: how to improve spectral efficiency by accepting interference", ECOC 2011 Mo-1-B-1. The working principle is illustrated in FIGS. 1a, 1b and 1c.

As illustrated in FIG. 1a, for carrier frequencies in which $\Delta F = 2\alpha \cdot B$, there is no spectral overlap and hence no ISI. However, as illustrated in FIG. 1b for carrier frequencies in which $\Delta F < 2\alpha \cdot B$ some spectral overlap occurs and hence ISI occurs. In FIG. 1c "faster than Nyquist" transmission is illustrated in which $\Delta F < BW_0$. Substantial optical or electrical filtering is applied to reduce the ISI. However, "faster than Nyquist" transmission includes a class of modulation and detection schemes which all rely on sophisticated digital signal processing algorithms. These are generally difficult to implement, especially at high transmission speeds.

Recently, however, new techniques have been introduced which present affordable implementation complexity with state-of-art integrated circuits (ICs). Such an implementation is known as "Frequency Packing" techniques. "Frequency Packing" techniques comprise nonoverlapping frequency carriers having a frequency separation $\Delta F$ lower that the baud rate B, i.e. $\Delta F < B$.

Configuring such super-channels is further complicated by dynamic traffic allocation which is employed in existing optical networks. Individual Dense Wavelength Division Multiplexing (DWDM) channels of an optical network can be routed on new paths and wavelengths accordingly reassigned following new traffic planning or for protection needs. However, the Optical Signal to Noise Ratio (OSNR) and other propagation impairments impose restrictions on setting a new path, requiring in some cases the use of expensive Resizing, Reshaping, Retiming (3R) regeneration. As a result, adaptive transponders have been developed by which modulation format is swapped and/or the Forward Error Correction (FEC) code is changed in order to increase robustness with respect to OSNR. However, swapping modulation format, e.g. from 16QAM to QPSK, has two disadvantages. First, this increases the complexity of the modulation architecture and Digital Signal Processing (DSP) that would be needed to handle both formats. Second, smooth transitions of the line rate in swapping the formats (e.g. swapping from 16QAM to QPSK) is not possible and therefore the baud rate does not remain constant and the data rate is halved. In existing systems, a smooth transition has been achieved within a narrow data rate range by changing the FEC algorithm. The line rate is kept constant reducing the data rate but allocating more overhead (OH) for FEC.

SUMMARY OF INVENTION

The present invention seeks to provide a system which mitigated the disadvantages above in improved spectral efficiency with increased robustness with respect to OSNR.

This is achieved, according to an aspect of the present invention, by a method of configuring an optical path for transmission of data from a source node to a destination node. The optical path comprises an optical channel for parallel transmission of non overlapping frequency carriers, the frequency separation of the carriers being lower than the baud rate. The method comprises the steps of (a) determining a path OSNR ($OSNR_p$) of the path; (b) selecting a carrier bandwidth (BW), so that the channel bandwidth ($BW_T$) is less than or equal to a maximum path bandwidth (Bp) available for transmission, wherein the channel bandwidth, $B_T \approx BW \cdot C$, wherein BW is the carrier bandwidth and C is the number of frequency carriers; (c) selecting a FEC code having a minimum overhead requirement; (d) determining a channel OSNR ($OSNR_T$) based on the currently selected carrier bandwidth (BW) and the currently selected FEC code; (e) in response to determining that the channel OSNR ($OSNR_T$) is not less than or equal to the path OSNR ($OSNR_p$), reselect new codes having increasing overhead requirements until the channel OSNR ($OSNR_T$) is less than the path OSNR ($OSNR_p$), and if this is not possible increase the bandwidth (BW) of carrier frequencies and return to step (c); (h) configuring the path for transmission based on the finally selected channel bandwidth (BW) of carrier frequencies and the finally selected FEC code.

This is also achieved, according to a second aspect of the present invention, by apparatus for configuring an optical path for transmission of data from a source node to a destination node. The optical path comprises an optical channel for parallel transmission of non overlapping frequency carriers, the frequency separation of the carriers being lower than the baud rate. The apparatus comprises a receiver for receiving the path OSNR ($OSNR_P$) at the destination node; a processor configurable to: (a) select a carrier bandwidth (BW) so that the channel bandwidth ($BW_T$) is less than or equal to a maximum path bandwidth ($B_P$) available for transmission, wherein the channel bandwidth, $B_T \approx BW \cdot C$, wherein BW is the carrier bandwidth and C is the number of frequency carriers; (b) select a FEC code having a minimum overhead requirement; (c) determine a channel OSNR ($OSNR_T$) based on the currently carrier bandwidth (BW) and the currently selected FEC code; (d) determine if the target OSNR ($OSNR_T$) is less than or equal to the determined, path OSNR ($OSNR_p$); (e) in response to determining that the channel OSNR ($OSNR_T$) is not less than or equal to the path OSNR ($OSNR_p$), reselect new FEC codes having increasing overhead requirements until the channel OSNR ($OSNR_T$) is less than the path OSNR ($OSNR_p$), and if this is not possible increase the carrier bandwidth (BW) and return to step (b); (f) select a new FEC code based on the current target OSNR and the currently selected bandwidth; a filter control module for controlling the bandwidth of the path according to the finally selected channel bandwidth BW; a FEC code output module for outputting the finally selected FEC code for encoding data for transmission via the path.

This is also achieved, according to a third aspect of the present invention, by a transmitter for transmitting a signal from a source node to a destination node via an optical path. The optical path comprises an optical channel for parallel transmission of non overlapping frequency carriers. The frequency separation of the carriers is lower than the baud rate. The transmitter is controlled by the apparatus according to the second aspect above. The transmitter comprises an encoder for encoding the signal according to the FEC code output by the FEC code output module, a modulator for modulating the encoded signal for transmission and a bandpass filter controlled by the filter control module.

This is also achieved, according to a fourth aspect of the present invention, by a receiver for receiving a signal at a destination node transmitted from a source node via an optical path. The optical path comprises an optical channel for parallel transmission of non overlapping frequency carriers. The frequency separation of the carriers is lower than the baud rate. The receiver communicates with the apparatus according to the second aspect above. The receiver comprises a decoder for decoding the received signal including the finally selected FEC code.

In this way, an optimal number of sub-carriers and an optimal FEC are selected in order to carry traffic and have spectral-efficient transmission. This enables exploitation of the advantages of "frequency packing" techniques to realise adaptive spectral-efficient transmission having improved robustness with respect to OSNR.

This invention exploits the advantages of frequency packing techniques to realize adaptive spectral-efficient transmission with no need of redundant architectures to enable multiple modulation formats. The data rate is simply varied by activating a suitable number of optical carriers in the super-channel and accordingly choosing FEC algorithm and data rate.

BRIEF DESCRIPTION OF DRAWINGS

For a more complete understanding of the present invention, reference is now made to the following description taken in conjunction with the accompanying drawings in which.

DETAILED DESCRIPTION OF EMBODIMENTS OF THE INVENTION

Figure 1A:
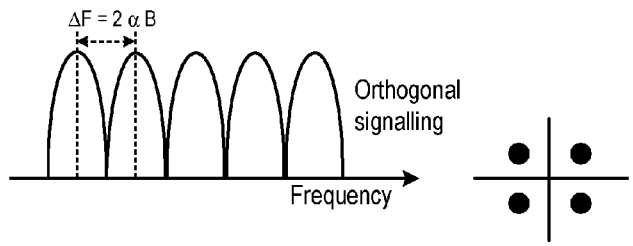
FIGS. 1a to 1c are simplified schematics illustrating the "faster than Nyquist" principle.
Figure 1B:
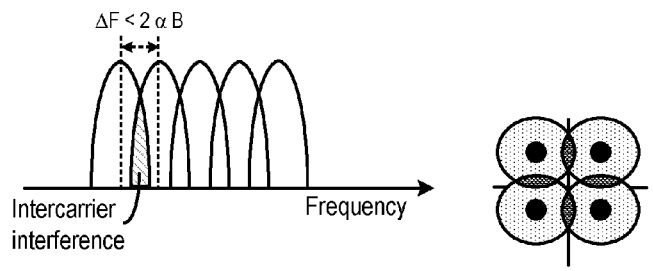
Figure 1C:
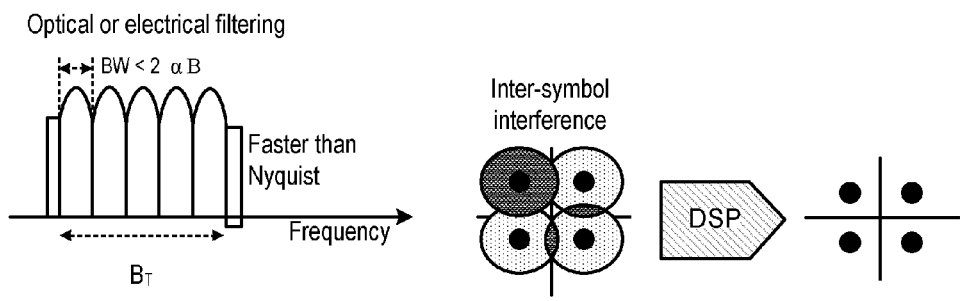
Figure 2:
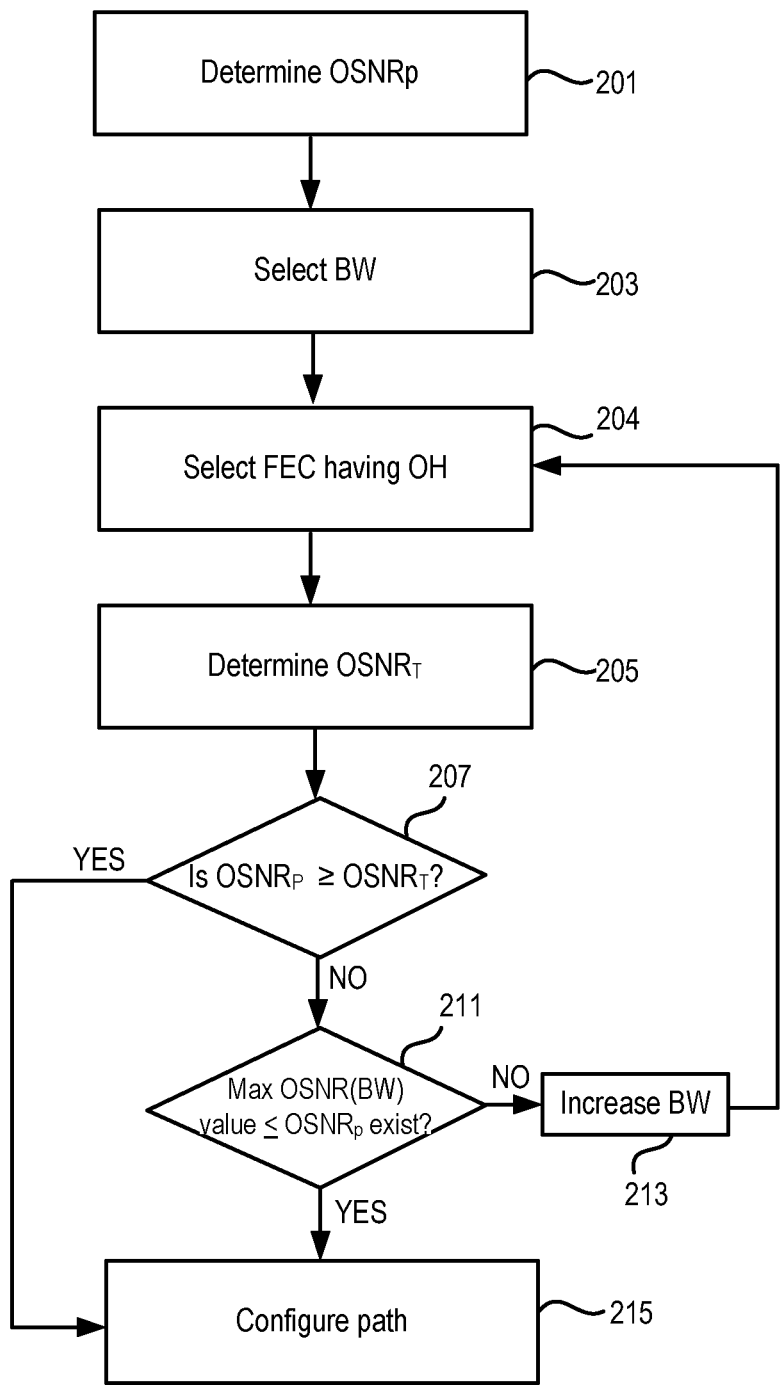
FIG. 2 is a flowchart of a method of configuring a communication path according to an embodiment of the present invention.
Figure 6:
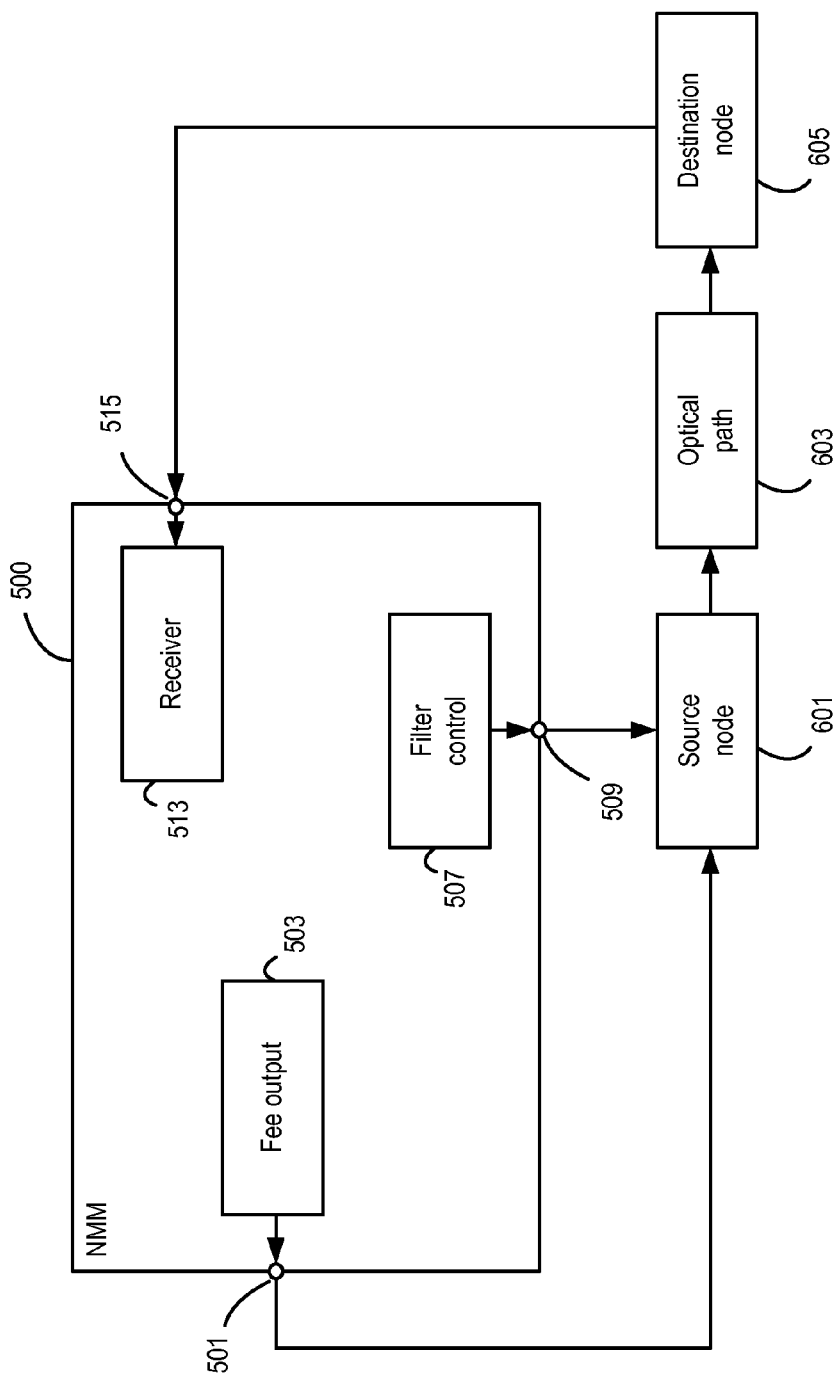
FIG. 6 is a simplified schematic of the apparatus of FIG. 5 connected to a communication path according to an embodiment of the present invention.

FIG. 2 illustrates a method, according to an embodiment of the present invention, of configuring an optical path 603, shown in FIG. 6, for transmission of data from a source node 601 to a destination node 605. The optical path 603 comprises an optical channel for parallel transmission of non overlapping frequency carriers, the frequency separation of the carriers being lower than the baud rate, for example, using "frequency packing" techniques. In a first step 201, a path OSNR ($OSNR_p$) of the path 603 is determined. A carrier bandwidth (BW) is selected, step 203, so that the channel bandwidth ($BW_T$) is less than or equal to a maximum path bandwidth ($B_P$) available for transmission, wherein the channel bandwidth, $B_T \approx BW \cdot C$, wherein BW is the carrier bandwidth and C is the number of frequency carriers. The optical channel path bandwidth ($B_P$) is the pass band of the cascade of Reconfigurable Optical Add-Drop Multiplexers (ROADMs) along the optical path 603.

A FEC code having a minimum overhead requirement is selected, step 204. A channel OSNR ($OSNR_T$) based on the currently selected carrier bandwidth (BW) of carrier frequencies and the currently selected FEC code is determined, step 205. In response to determining that the channel OSNR ($OSNR_T$) is not less than or equal to the path OSNR ($OSNR_p$), step 207, reselect new FEC codes having increasing overhead requirements until the channel OSNR (OSNR$_T$) is less than the path OSNR (OSNR$_p$), step 211, i.e. more powerful codes (lower data rates) have to be used. The line rate is kept constant and the number of carriers is maintained, as a result OSNR$_T$ changes. If this is not possible, i.e. the maximum channel OSNR (OSNR$_T$) that is less than the path OSNR (OSNR$_p$) does not exist, step 211, the carrier bandwidth (BW) is increased, step 213. This may require switching off some carriers, e.g. alternating carriers. The process then returns to step 204. This provides a simplified technique of improving the performance a rate that avoids over-dimensioning and any lose of spectral efficiency. Once the channel OSNR (OSNR$_T$) is less than or equal to the path OSNR (OSNR$_p$), step 207, the path 603 for transmission is configured, step 215, based on the finally selected channel bandwidth (B$_T$) of carrier frequencies and the finally selected FEC code.

Figure 3:
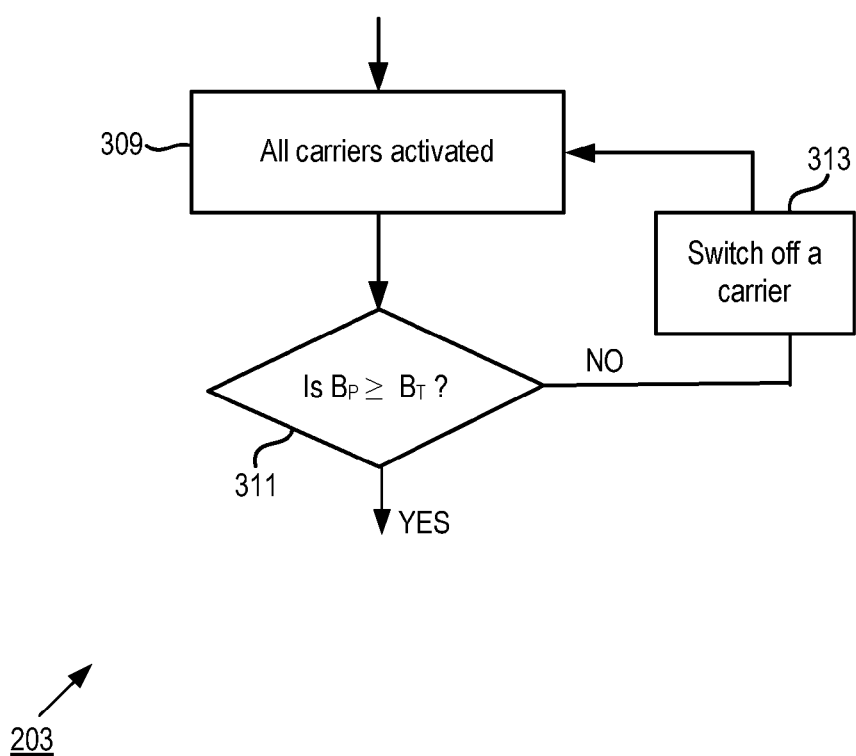
FIG. 3 is a flowchart of details of step 203 of the method of FIG. 2.

Each carrier frequency may be independently activated and deactivated. As illustrated in FIG. 3, the selection of the channel bandwidth (B$_T$) of carrier frequencies, step 203 of the embodiment of FIG. 2 comprises activating all the carrier frequencies of the channel, step 309, and switching carriers off either individually, or for faster processing, a multiple number of carriers, for example switching off alternating carriers to effectively double the carrier bandwidth (BW), step 313, until the channel bandwidth (B$_T$) of carrier frequencies is less than or equal to a maximum path bandwidth (B$_P$) available for transmission, step 311. For a number of carriers, C, the channel bandwidth, B$_T$ is: B$_T$=C·(BW+GB), where GB is the guarband that may be allocated to take into account non ideal conditions of the filters response. This provides controlled changes of BW to help avoid over-dimensioning the optical path.

Figure 4:
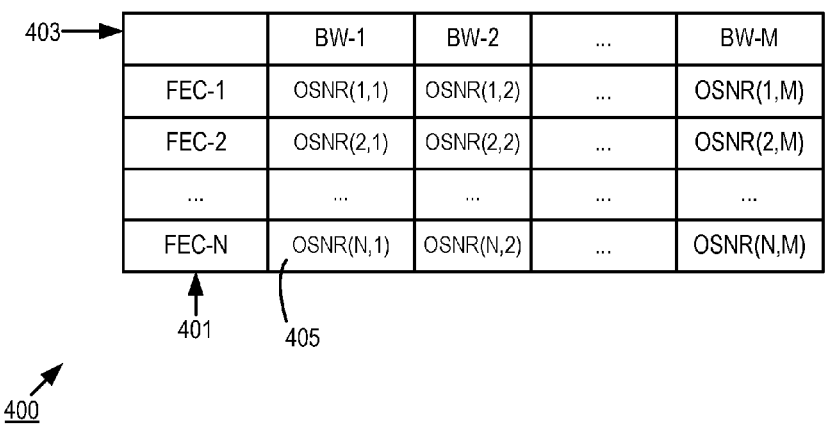
FIG. 4 is an example of a lookup table according to the embodiment of the present invention.

The FEC code may be selected by using a look up table as shown in FIG. 4. For each column 401 of the look up table 400, contains a different carrier bandwidth BW-1 to BW-M where BW-1<BW-2< . . . <BW-M. Each row 403 of the lookup table contains a different FEC code FEC-1 to FEC-N. Each of the FEC codes has an associated overhead OH-1, OH-2 . . . OH-N and error correction capability such that OH-1<OH-2< . . . <OH-N. Each cell 405 of the look up table 400 contains the corresponding channel OSNR (OSNR$_T$) for the specific carrier bandwidth BW and FEC code such that if h<l, OSNR$_T$ (h,k)>OSNR$_T$ (i,k) and if m<n, it is OSNR$_T$ (l,m)>OSNR$_T$ (l,n), i.e. OSNR$_T$(1,1)>OSNR$_T$(2,1) and OSNR$_T$(1,1)>OSNR$_T$(1,2). Therefore, for a specific carrier bandwidth (BW), the FEC code having the minimum overhead and the corresponding channel OSNR (OSNR$_T$) can be selected by reference to the look up table of FIG. 4. This provides a simplified implementation in selecting FEC codes and in determining a target OSNR. Further the same lookup table can be used for selecting FEC codes and in determining a target OSNR, thus reducing resource requirements.

In activating all carrier frequencies of the channel in step 309, this condition corresponds to maximum SE and minimum OSNR performance, with OSNR$_T$=OSNR(1,1).

Figure 5:
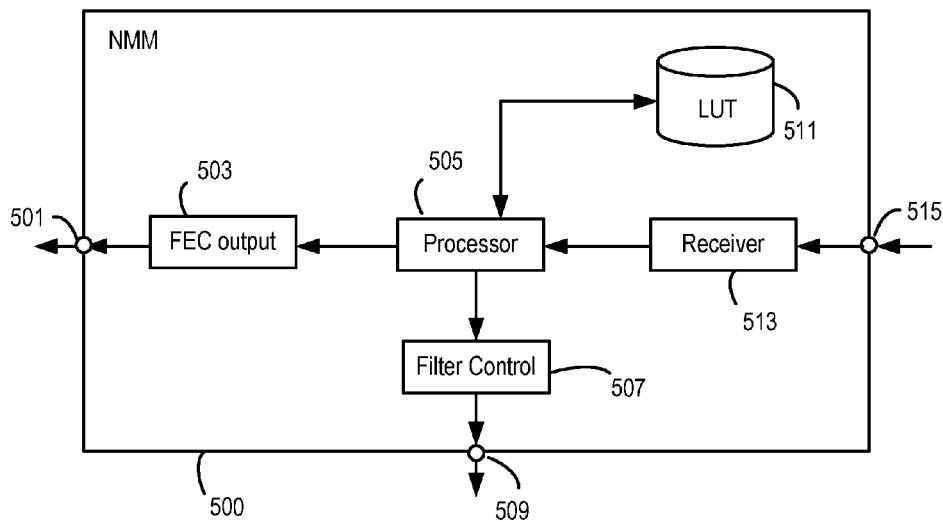
FIG. 5 is a simplified schematic of the apparatus for configuring a communication path according to an embodiment of the present invention.

The apparatus 500 for configuring an optical path 603 for transmission of data from a source node 601 to a destination node 605 is shown in FIG. 5. The optical path 603 comprises an optical channel for parallel transmission of non overlapping frequency carriers. The frequency separation of the carriers is lower than the baud rate. The apparatus 500 comprises a receiver 513 for receiving the path OSNR (OSNR$_P$) at the destination node 605; a processor 505 configurable to: (a) select a carrier bandwidth (BW) so that the channel bandwidth (B$_T$) is less than or equal to a maximum path bandwidth (B$_P$) available for transmission, wherein the channel bandwidth, B$_T$≈BW·C, wherein BW is the carrier bandwidth and C is the number of frequency carriers; (b) select a FEC code having a minimum overhead requirement; (c) determine a channel OSNR (OSNR$_T$) based on the currently selected carrier bandwidth (BW) and the currently selected FEC code; (d) determine if the target OSNR (OSNR$_T$) is less than or equal to the determined, path OSNR (OSNR$_p$); (e) in response to determining that the channel OSNR (OSNR$_T$) is not less than or equal to the path OSNR (OSNR$_p$), reselect new FEC codes having increasing overhead requirements until the channel OSNR (OSNR$_T$) is less than the path OSNR (OSNR$_p$) and if this is not possible, increase the carrier bandwidth (BW) of carrier frequencies and return to step (b); (f) select a new FEC code based on the current target OSNR and the currently selected bandwidth. The apparatus 500 further comprises a filter control module 507 for controlling the bandwidth of the path according to the finally selected channel bandwidth and a FEC code output module 503 for outputting the finally selected FEC code for encoding data for transmission via the path 603.

The input of the receiver 513 is connected to an input terminal 515 of the apparatus 500. The output of the receiver 513 is connected to the processor 505. The processor 505 is connected to the FEC output module 503 and a filter control module 507. A first output terminal 501 of the apparatus 500 is connected to the output of the FEC output module 503 and a second output terminal 509 is connected to the output of the filter control module 507. The processor 505 is also connected to a storage device 511. The storage device 511 may be integral with the apparatus 500 as shown in FIG. 5 or, alternatively, it may be external thereto. The storage device 511 stores the look up table of FIG. 4.

The processor 505 is configured to carry out the processes of FIGS. 2 and 3 and the finally selected FEC code is output via the first output terminal 501 and the finally selected channel bandwidth BW is used by the filter control module 507 to generate the required outputs on the second output terminal 509 to control the band pass filtering of the transmitter of the source 601 of the path 603.

As illustrated in FIG. 6, the input terminal 515 of the apparatus 500 receives the path OSNR (OSNR$_P$) which is established during the planning stage of the network at the destination node 605 of the optical path 603. The path OSNR (OSNR$_P$) may be a measured value or an estimated value. The first and second output terminals 501, 509 of the apparatus 500 are connected to a transmitter, for example the transmitter of FIG. 8, of a source node 601 of the optical path 603 to configure the path 603 according to the processes described above with reference to FIGS. 2 and 3.

Figure 7:
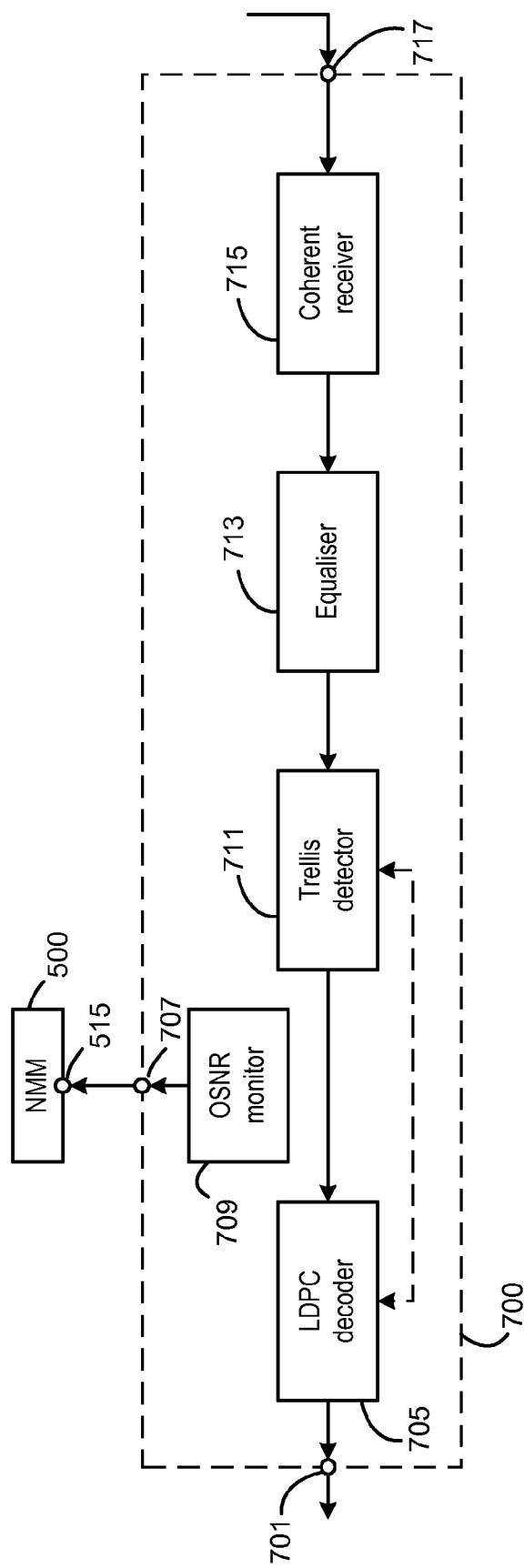
FIG. 7 is a simplified schematic of a receiver according to an embodiment of the present invention.
Figure 8:
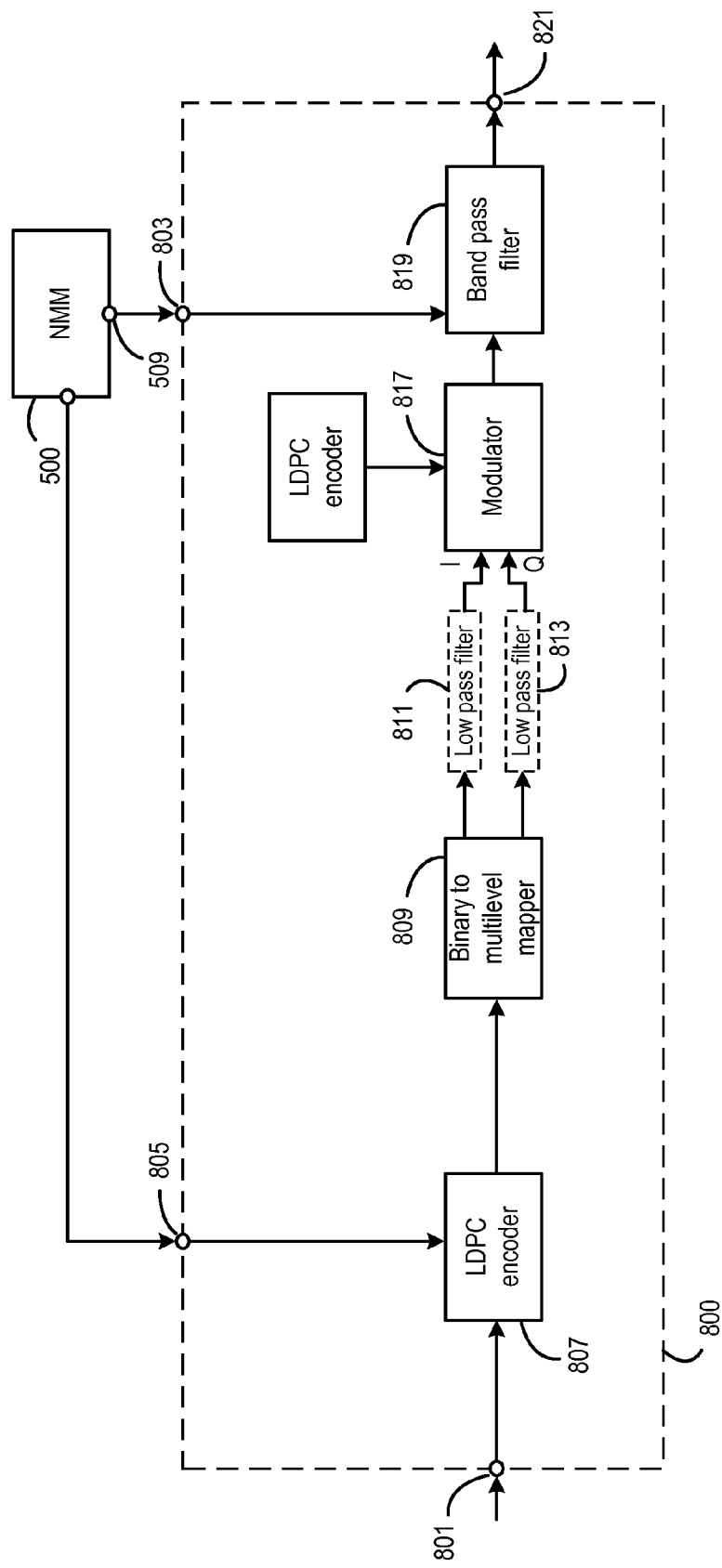
FIG. 8 is simplified schematic of a transmitter according to an embodiment of the present invention.

FIGS. 7 and 8 illustrate the receiver and transmitter according to an embodiment of the present invention.

The apparatus 500 controls the configuration of the optical path 603 via which the transmitter 800 transmits data from a source node 601 to the destination node 605.

The first output terminal 501 of the apparatus 500 is connected to a first input terminal 805 and the second output terminal 509 of the apparatus 500 is connected to a second input terminal 803 of the transmitter 800. A signal to be transmitted is input on the third input terminals 801. The third input terminal 801 is connected to the input of a Low Density Parity Check (LDPC) encoder 807. The LDPC encoder 807 encodes the bits of the received signal to be transmitted utilising the finally selected FEC code provided by the FEC output module 503 via the first input terminal 805. The encoded signal is forwarded to a binary to multi-level mapper 809 for mapping these encoded signals into two multi-level signals (I and Q lines) according to a chosen modulation format. For example, the number of levels on each line is 2 for QPSK and 4 for 16QAM. Optionally, the signals on the I and Q lines are electrically low passed filtered by the respective filters 811, 813 in order to further reduce, by a factor k, the carrier bandwidth BW with respect to the baseband signal width, $BW_0$ in Eq. 2:

$$BW = k \cdot \alpha \cdot B = \alpha \cdot R_b \cdot \log_2(M) \qquad \text{Eq. 3}$$

For example, with k=0.28 it is possible to transmit 1 Terabit/s over a 200 GHz frequency slot (SE 5 bit/s/Hz) by using seven 30 GHz spaced Dual Polarization QPSK (DP-QPSK) modulated carriers.

The filtered I and Q signals are modulated by the modulator 817 and the laser 815 to provide the modulated optical signal which is filtered by the band pass filter 819. The parameters of the band pass filter 819 are provided by the filter control module 507 via the second input terminal 803. The band pass filter 819 can be used in place, partly or in toto, of the lower pass filters 811, 813, usually placed at the add line of a ROADM node, before transmission into the optical channel.

The output of the band pass filter 819 is provided on the output terminal 821 of the transmitted onto the optical channel of the optical path 603.

A receiver 700 according to an embodiment of the present invention is shown in FIG. 7. The transmitted signal is received at the input terminal 717 of the receiver 700. This is forwarded to a coherent front end receiver 715 which is connected to the input terminal 717 of the apparatus 700. As in regular coherent transceivers the coherent front end receiver 715 is followed by an equalizer 713. Then, a trellis detector 711, whose complexity is constrained within the limits of available technology (e.g. max 16 states) is followed by a LDPC decoder 705 for final bits estimation. Trellis detector 711 and LDPC decoder iteratively exchange information to refine the estimation. Different LDPC codes, with different OH and error correction capabilities, can be picked up from a basket of available codes and therefore does not require any hardware reconfiguration.

For a receiver 700 integral with the destination node 605, the receiver may, optionally, comprises an OSNR monitor 709 which measures or estimates the path OSNR ($OSNR_P$) during the planning stage of the network and output the $OSNR_P$ to the apparatus 500 via the second output terminal 707 of the receiver 700.

As a result, in accordance with the embodiments above, the implementation is simplified since QPSK is also used for very high transmission speeds. Smooth transitions in changes in the data rate can be achieved over a wide OSNR range. There is reduced complexity of the transceivers compared to those necessary to manage multiple modulation formats in for dynamic traffic allocation. This system of the embodiments enables different carriers to be added at different times, making the system more modular and scalable.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

The invention claimed is:

1. A method of configuring an optical path for transmission of data from a source node to a destination node, the optical path comprising an optical channel for parallel transmission of non overlapping carrier frequencies, the frequency separation of the carrier frequencies being lower than the baud rate, the method comprising:
   (a) determining a path OSNR of the path; and performing, by a processor, steps comprising:
   (b) selecting a carrier bandwidth so that the channel bandwidth is less than or equal to a maximum path bandwidth available for transmission, wherein the channel bandwidth, $B_T \approx BW \cdot C$, wherein BW is the carrier bandwidth and C is the number of carrier frequencies;
   (c) selecting a FEC code having a minimum overhead requirement;
   (d) determining a target OSNR based on the currently selected carrier bandwidth and the currently selected FEC code;
   (e) in response to determining that the target OSNR is not less than or equal to the path OSNR, reselect new FEC codes having increasing overhead requirements until the target OSNR is less than the path OSNR, and if this is not possible increase the carrier bandwidth and return to step (c); and
   (f) configuring the path for transmission based on the finally selected channel bandwidth of carrier frequencies and the finally selected FEC code.

2. A method according to claim 1, wherein each carrier frequency is independently activated and deactivated, the step of selecting a channel bandwidth of carrier frequencies comprises:
   selectively activating or deactivating a number of the optical carrier frequencies of the channel.

3. A method according to claim 1, wherein the step of increasing the carrier bandwidth comprises deactivating a selection of carrier frequencies.

4. A method according to claim 3, wherein the step of: deactivating a selection of carrier frequencies comprises the step of:
   selectively deactivating alternating carriers of the channel to double the carrier bandwidth.

5. A method according to claim 1, wherein the step of selecting a FEC code having a minimum overhead comprises the step of:
   looking up a FEC code having a minimum overhead requirement in a look up table.

6. A method according to claim 1, wherein the step of determining a target OSNR comprises the step of:
   looking up the value of OSNR entered in a look up table for the carrier bandwidth of the currently selected channel bandwidth of carrier frequencies and the currently selected FEC code.

7. A method according to claim 1, wherein the step of selecting a channel bandwidth of carrier frequencies less than or equal to a maximum path bandwidth available for transmission comprises the steps of:
   (i) activating all carrier frequencies of the optical channel; and
   (ii) in response to determining that the channel bandwidth of carrier frequencies is not less than or equal to a maximum path bandwidth available for transmission, deactivating a carrier frequency of the optical channel until the channel bandwidth of carrier frequencies is less than or equal to a maximum path bandwidth available for transmission.

8. A method according to claim 1, wherein the step of determining the path OSNR of the channel at the destination node comprises the step of:

measuring or estimating the OSNR at the destination node.

9. An apparatus for configuring an optical path for transmission of data from a source node to a destination node, the optical path comprising an optical channel for parallel transmission of non overlapping carrier frequencies, the frequency separation of the carrier frequencies being lower than the baud rate, the apparatus comprising:
a receiver for receiving the path OSNR at the destination node;
a processor configurable to:
(a) select a carrier bandwidth so that the channel bandwidth is less than or equal to a maximum path bandwidth available for transmission, wherein the channel bandwidth, $B_T \approx BW \cdot C$, wherein BW is the carrier bandwidth and C is the number of carrier frequencies;
(b) select a FEC code having a minimum overhead requirement;
(c) determine a target OSNR based on the currently selected carrier bandwidth and the currently selected FEC code;
(d) determine if the target OSNR is less than or equal to the path OSNR;
(e) in response to determining that the target OSNR is not less than or equal to the path OSNR, reselect new FEC codes having increasing overhead requirements until the target OSNR is less than the path OSNR, and if this is not possible increasing the carrier bandwidth and return to step (b);
(f) select a new FEC code based on the current target OSNR and the currently selected bandwidth;
a filter control module for controlling the bandwidth of the path according to the finally selected channel bandwidth; and
a FEC code output module for outputting the finally selected FEC code for encoding data for transmission via the path.

10. The apparatus according to claim 9, wherein the apparatus further comprises:
a storage device for storing a look up table of a plurality of carrier bandwidths and FEC codes and corresponding OSNR values.

11. The apparatus according to claim 10, wherein the lookup table is configured to enable lookup of an OSNR value for each FEC code having different overhead requirements for each carrier bandwidth.

12. A transmitter for transmitting a signal from a source node to a destination node via an optical path, the optical path comprising an optical channel for parallel transmission of non overlapping carrier frequencies, the frequency separation of the carrier frequencies being lower than the baud rate, the transmitter being controlled by the apparatus according to claim 9, the transmitter comprising:
an encoder for encoding the signal according to the FEC code output by the FEC code output module;
a modulator for modulating the encoded signal for transmission; and
a bandpass filter controlled by the filter control module.

13. A receiver for receiving a signal at a destination node transmitted from a source node via an optical path, the optical path comprising an optical channel for parallel transmission of non overlapping carrier frequencies, the frequency separation of the carrier frequencies being lower than the baud rate, the receiver communicating with the apparatus according to claim 9 and wherein the receiver comprises:
a decoder for decoding the received signal including the finally selected FEC code.

14. A receiver according to claim 13, wherein the receiver further comprises:
an OSNR monitor module for measuring or estimating the value of the OSNR at the destination node, the OSNR monitor module being connectable to the receiver of the apparatus.

* * * * *

UNITED STATES PATENT AND TRADEMARK OFFICE
CERTIFICATE OF CORRECTION

PATENT NO. : 9,806,804 B2
APPLICATION NO. : 14/407066
DATED : October 31, 2017
INVENTOR(S) : Cavaliere Page 1 of 2

It is certified that error appears in the above-identified patent and that said Letters Patent is hereby corrected as shown below:

On the Title Page

On Page 2, in Item (57), under "ABSTRACT", in Column 1, Line 1, delete "(h)" and insert -- (f) --, therefor.

On Page 2, in Item (57), under "ABSTRACT", in Column 1, Line 2, delete "$BW_T$and" and insert -- $BW_T$ and --, therefor.

In the Specification

In Column 1, Line 55, delete "Quadrature" and insert -- Quadrature Phase --, therefor.

In Column 2, Line 65, delete "(Bp)" and insert -- $(B_p)$ --, therefor.

In Column 3, Line 11, delete "(h)" and insert -- (f) --, therefor.

In Column 4, Line 38, delete "is" and insert -- is a --, therefor.

In Column 7, Line 31, delete "apparatus 700." and insert -- apparatus 500. --, therefor.

In the Claims

In Column 8, Line 6, in Claim 1, delete "that the" and insert -- that a --, therefor.

In Column 8, Line 36, in Claim 4, delete "of:" and insert -- of --, therefor.

In Column 8, Line 39, in Claim 4, delete "carriers" and insert -- carrier frequencies --, therefor.

Signed and Sealed this
Thirtieth Day of April, 2019

Andrei Iancu
*Director of the United States Patent and Trademark Office*

In Column 9, Line 9, in Claim 9, delete "receiving the" and insert -- receiving a --, therefor.

In Column 10, Line 35, in Claim 14, delete "OSNR" and insert -- path OSNR --, therefor.